US012221257B1

(12) United States Patent
Anderson

(10) Patent No.: US 12,221,257 B1
(45) Date of Patent: Feb. 11, 2025

(54) BOTTLE PRESSURE SEAL WITH ENVIRONMENTAL DATA LOGGING

(71) Applicant: Grand Cru Vault, LLC, San Diego, CA (US)

(72) Inventor: Paul Anderson, San Diego, CA (US)

(73) Assignee: Grand Cru Vault, LLC, San Diego, CA (US)

( * ) Notice: Subject to any disclaimer, the term of this patent is extended or adjusted under 35 U.S.C. 154(b) by 0 days.

(21) Appl. No.: 18/651,666

(22) Filed: Apr. 30, 2024

(51) Int. Cl.
*G06Q 10/08* (2024.01)
*B65D 45/32* (2006.01)
*B65D 55/00* (2006.01)

(52) U.S. Cl.
CPC ............. *B65D 55/00* (2013.01); *B65D 45/32* (2013.01); *B65D 2201/00* (2013.01); *G06Q 10/08* (2013.01)

(58) Field of Classification Search
CPC .... B65D 55/00; B65D 45/32; B65D 2201/00; G06Q 10/08
See application file for complete search history.

(56) References Cited

U.S. PATENT DOCUMENTS

| | | | | |
|---|---|---|---|---|
| 6,793,081 | B1 * | 9/2004 | Derman | B65D 55/14 215/280 |
| 7,743,796 | B1 * | 6/2010 | Schooley | G01K 1/14 141/381 |
| 8,161,761 | B2 | 4/2012 | Shao | |
| 8,899,428 | B2 * | 12/2014 | Penafiel | B65D 1/023 220/DIG. 19 |
| 9,511,910 | B2 | 12/2016 | Puccini | |
| 9,546,916 | B1 * | 1/2017 | Crane | G01N 25/56 |
| 10,254,265 | B1 * | 4/2019 | Rezayat | G01N 33/146 |
| 10,371,684 | B1 * | 8/2019 | Rezayat | G01N 33/146 |
| 10,521,766 | B2 | 12/2019 | Alvarez et al. | |
| 10,996,207 | B1 * | 5/2021 | Taheri | B65D 85/72 |
| 11,801,980 | B1 * | 10/2023 | Siann | B65D 51/145 |

(Continued)

FOREIGN PATENT DOCUMENTS

| | | | |
|---|---|---|---|
| CN | 102519686 A | * | 6/2012 |
| CN | 102519686 B | * | 8/2016 |

(Continued)

OTHER PUBLICATIONS

Tao, Y., García, J. F., & Sun, D. W. (2013). Advances in Wine Aging Technologies for Enhancing Wine Quality and Accelerating Wine Aging Process. Critical Reviews in Food Science and Nutrition, 54(6), 817-835. https://doi.org/10.1080/10408398.2011.609949 (Year: 2011).*

(Continued)

*Primary Examiner* — Ashford S Hayles
(74) *Attorney, Agent, or Firm* — ARC IP Law, PC; Joseph J. Mayo

(57) ABSTRACT

A bottle pressure seal with environmental data logging that is coupled to a bottle and that seals the atmospheric pressure outside of the bottle so that the internal pressure of the bottle and cork are maintained at whatever pressure they came into equilibrium with regardless of the external pressure outside of device and bottle. In the event of air travel, where the pressure can be on the order of 2500 to 3500 meters, the internal pressure of the bottle and the pressure on the cork remains at the initial pressure at the time that the device was placed on the bottle.

11 Claims, 8 Drawing Sheets

(56) References Cited

U.S. PATENT DOCUMENTS

| | | | |
|---|---|---|---|
| 2003/0047219 A1* | 3/2003 | Chen | G05D 16/2066 137/565.23 |
| 2006/0026971 A1* | 2/2006 | Sharpe | G01K 13/00 62/126 |
| 2006/0151422 A1* | 7/2006 | Manley | B65D 50/062 215/276 |
| 2008/0140432 A1* | 6/2008 | Fenn | G06Q 10/087 705/317 |
| 2009/0038374 A1* | 2/2009 | Broz | G01N 33/46 73/23.37 |
| 2009/0093785 A1* | 4/2009 | Brown | G01D 9/007 604/404 |
| 2010/0117797 A1* | 5/2010 | Bauchot | H04Q 9/00 220/212 |
| 2010/0163511 A1* | 7/2010 | Cappello | B65D 51/1616 215/341 |
| 2012/0159968 A1 | 6/2012 | Doucet et al. | |
| 2013/0317764 A1* | 11/2013 | Kumar | G06Q 40/10 702/54 |
| 2013/0334259 A1* | 12/2013 | White | B65D 83/0005 222/386 |
| 2014/0061234 A1* | 3/2014 | Eldreth | B05B 11/0059 222/105 |
| 2014/0246396 A1* | 9/2014 | Jepson | G06F 16/00 702/140 |
| 2015/0000371 A1* | 1/2015 | Greene | G01N 33/146 73/19.1 |
| 2015/0293067 A1* | 10/2015 | Greene | G01N 33/0042 356/72 |
| 2015/0307245 A1* | 10/2015 | Puccini | G01K 1/022 702/130 |
| 2017/0253361 A1* | 9/2017 | Tu | B67B 7/066 |
| 2018/0032948 A1* | 2/2018 | Alvarez | C12L 11/00 |
| 2018/0099803 A1* | 4/2018 | Kagramanyan | A23L 3/3418 |
| 2019/0026511 A1* | 1/2019 | Whittington | G06K 7/1413 |
| 2019/0039785 A1* | 2/2019 | Gormley | B65D 81/2076 |
| 2019/0302082 A1* | 10/2019 | Cunningham | G01N 33/146 |
| 2020/0095532 A1* | 3/2020 | Yang | C12M 37/00 |
| 2021/0316917 A1* | 10/2021 | Geronian | B65D 51/1644 |
| 2022/0063883 A1* | 3/2022 | Mott | B65D 55/02 |
| 2022/0065843 A1* | 3/2022 | Slone | G01N 33/146 |
| 2022/0306347 A1* | 9/2022 | Slone | C12H 1/22 |
| 2023/0069242 A1* | 3/2023 | Berresford | C12H 1/14 |

FOREIGN PATENT DOCUMENTS

| | | | | |
|---|---|---|---|---|
| CN | 206573249 U | * | 10/2017 | |
| CN | 209667729 U | * | 11/2019 | |
| CN | 111971248 B | | 11/2020 | |
| CN | 113387028 B | | 9/2021 | |
| CN | 218113627 U | * | 12/2022 | |
| JP | 2022084610 A | * | 6/2022 | A61L 2/07 |
| WO | 2008106329 A2 | | 9/2008 | |
| WO | WO-2016199099 A1 | * | 12/2016 | G01N 27/02 |
| WO | WO-2019118464 A1 | * | 6/2019 | B65D 81/18 |
| WO | WO-2019194810 A1 | * | 10/2019 | A23L 3/3418 |
| WO | WO-2020098369 A1 | * | 5/2020 | G01L 5/00 |

OTHER PUBLICATIONS

Xing, R., Liu, D., Li, Z., Tian, Y., Zhang, X., Li, J., & Pan, Q. (2016). Impact of different types of stoppers on sensorial and phenolic characteristics evolution during a bottle storage time of a white wine from chardonnay grape variety. Journal of Food Science and Technology, 53(11), 4043-4055. (Year: 2016).*

Furtado, I., Lopes, P., Oliveira, A. S., Amaro, F., de Lourdes Bastos, M., Cabral, M., . . . Pinto, J. (2021). The impact of different closures on the flavor composition of wines during bottle aging. Foods, 10(9), 2070. doi:https://doi.org/10.3390/foods 10092070 (Year: 2021).*

* cited by examiner 301
302
303
304

501 — Plug device into PC with USB

502 — Clear previous data

503 — Update data and time

504 — Update firmware

505 — Unplug USB

506 — Push button until status light flashes

507 — Data logging has begun

BOTTLE PRESSURE SEAL WITH ENVIRONMENTAL DATA LOGGING

BACKGROUND OF THE INVENTION

Field of the Invention

One or more embodiments of the invention are related to the field of pressure seals for bottles. More particularly, but not by way of limitation, one or more embodiments of the invention enable a device that seals the internal pressure of a bottle regardless of external pressure and includes environmental data logging including pressure, temperature and humidity over time.

Description of the Related Art

Wine and other alcohol beverages are sensitive to temperature and humidity conditions. If conditions are too warm, wine and other beverages can age quickly and spoil. If humidity is too low, then the cork can dry, resulting in oxygen exchange that can damage the wine. Therefore, it is desirable to monitor the conditions of wine and other beverages, especially when traveling with or shipping, to guarantee the condition. Other alcoholic beverages such as champagne and port, sherry and whiskey for example may be susceptible to pressure variations as well.

For older bottles of wine where the cork is deteriorating, there is higher risk of oxidation or leaks due to poor sealing. For example, this can be especially risky when traveling by airplane where higher altitudes shift in atmospheric pressure. Even though plane cabins are pressurized, there is still a pressure drop that occurs (hence why your ears pop when landing). If the atmospheric pressure drops, then the contents of the bottle are pressurized and may force air out through the cork or dislodge the cork altogether. The bottle will then reach equilibrium with the low atmospheric pressure. Upon landing where atmospheric pressures are higher than at altitude, atmosphere will push on the bottle cork and potentially increase the oxygen exchange rate or dislodge the cork.

There are no known solutions that provide a pressure seal for a bottle that also logs environmental data to ensure cork condition. For example, in U.S. Pat. No. 9,511,910 to Puccini, a device that fits into the capsule, i.e., the foil on top of a wine bottle, is described that logs temperature and humidity, but does not log pressure and is not a pressure seal. Thus, although the device is utilized for storage and confirmation of environmental conditions that the bottle is stored in, the device does not protect the cork from pressure variations as would occur on a flight for example. In addition, the pressure variations are not logged in any case, so no information is available as to what pressure range the bottle and specifically the cork have been subjected to.

For at least the limitations described above there is a need for a bottle pressure seal with environmental data logging.

BRIEF SUMMARY OF THE INVENTION

One or more embodiments described in the specification are related to a bottle pressure seal with environmental data logging. Given the risks associated with traveling with beverages that have no pressure seal, especially older bottles of wine or other spirits, it is beneficial to maintain constant pressure on the cork while flying, traveling, or shipping wine. Embodiments of the invention seal the atmospheric pressure into a chamber, preventing any changes in pressure that the cork might be exposed to. Embodiments of the invention include a battery-operated microcontroller and sensors to monitor and log temperature, humidity, and pressure data. When the bottle is received, the data can be extracted from the device and uploaded to a database for later consideration.

One or more embodiments of the invention include a bottle pressure seal with environmental data logging and couple to a bottle, via the neck of a wine bottle for example. Embodiments of the invention include a device that seals the atmospheric pressure outside of the bottle so that the internal pressure of the bottle and cork are maintained at whatever pressure they came into equilibrium with regardless of the external pressure outside of the device and bottle. Thus, in the event of air travel, where the pressure can be on the order of 1,800 to 2,400 meters (roughly 6,000 to 8,000 feet), the internal pressure of the bottle remains at the initial pressure at the time that the device was placed on the bottle. A bottle identifier may be added via a sticker or laser engraving to the bottle or added in any other manner to identify the particular bottle. One embodiment may utilize a QR code for example. Alternate examples may utilize RFID or bar codes or typewritten codes or any other code that identifies the bottle.

Embodiments of the invention include a cap that houses a battery, a printed circuit board (PCB) and a sensor device, along with a clamp and a gasket. The PCB may house a microcontroller or any type of computing element that is programmable and configured to sample data from the environmental sensors and record the data in memory within the microcontroller or coupled thereto for example.

Embodiments of the invention are placed on the bottle generally before storing or traveling, by placing the gasket on the neck of the bottle, placing the cap onto the bottle neck, fitting the clamp over the cap and gasket and tightening the claim, for example via the wingnut. Any other coupling device equivalent may be utilized so long as the seal from the gasket and the cap maintain the internal pressure that is exhibited on the cork of the bottle for example.

In one or more embodiments, the bottle identifier may be scanned, for example with a camera that interprets QR codes, although RFID or any other type of identifier may be utilized. After the bottle is identified via bottle identifier, an app, for example on a smart phone or other computing device, may be utilized to access an individualized web page or database entry for example. Specifically, by accessing a database, the pressure, temperature and humidity data that has been logged by the device may be viewed or otherwise analyzed to determine if conditions have been within acceptable ranges for the cork on the bottle. Purchase history or receipts may be viewed as well as any image of the bottle that was taken near the time that device was placed on the bottle or at purchase or thereafter.

Embodiments of the invention may include a pinhole on/off button, LED status light, data and charge port. In one or more embodiments, the data and charge port may be implemented with a USB-C data and charge port and LED battery charge level indicator. In one or more embodiments, the pinhole on/off button is pressed and held until the LED status light starts flashing, indicating that data logging has commenced. LED battery charge level may be increased via a charging adapter coupled with the data and charge port, which shows the battery level on the LED battery charge level indicator. Initialization and association of the identifier with a particular cap may be performed in a variety of ways. In one or more embodiments, the device and the bottle identifier is supplied so that the device is automatically associated with the identifier. In other embodiments, asserting the pinhole on/off button for a set duration of time, e.g., 5 seconds, puts out a communications pairing packet, e.g., a Bluetooth® packet, that is received by any local smart phone for example that is running an app in pairing mode. In this embodiment a camera on the mobile device otherwise referred to as a smart phone is utilized to capture the bottle identifier and transmit that code to the device. These embodiments bind a particular device to a particular bottle so that bottle pairing history is maintained locally. In one or more embodiments, the device has its own unique identifier, such as a Bluetooth® identifier. After pairing with a mobile device, an app running on the mobile device captures the bottle identifier via a camera and links that bottle identifier with the unique Bluetooth® identifier of the device. In this embodiment, the bottle identifier and the unique identifier of the device is either recorded in the app or stored in the database rather or both recorded in the app and stored in the database. After initialization data logging of the sensor data begins and can be done on a time slice basis, for example storing the data once per N seconds or M minutes or H hours, which can be set in one or more embodiments via any associated smart phone. In one or more embodiments, the data and charge port may be augmented or replaced by a wireless transceiver to provide communications and/or data logging to a remote server directly or via a proxy server or to provide for status checking including battery charge status.

The printed circuit board (PCB) and sensor device may couple with a battery holder that for example holds two 3 V batteries that power programmable microcontroller on the PCB board with sensors for temperature, pressure and humidity.

Initializing or otherwise configuring the device may be performed via USB with an external computer. For example, the device may be coupled with, for example plugged into a PC e.g., using a USB connection. Any other type of wired connection may be utilized in this hardwired embodiment. Any previous data may be optionally cleared. Any configuration data may be updated, i.e., the bottle ID for example, the time interval between environmental sensor sampling, the time for status updates, etc., as well as the time/date may be updated. Any firmware updates may also be performed. Once the device is configured, it may be unplugged. After configuration, the device may be initialized to begin data logging. In one or more embodiments, data may sampled and saved in internal memory or for example via a wireless connection according to the sampling interval previously defined. With longer sampling intervals, the longer the battery or batteries may last. In addition, pressure changes are generally slow, so longer time intervals on the orders of minutes generally suffices.

Saving data from the device via USB with an external computer may be accomplished by plugging into a PC e.g., using a USB connection. Any other type of wired connection may be utilized in this hardwired embodiment. Environmental data is uploaded to the computer. A unique serial code is optionally generated, otherwise a unique device identifier from the device, such as a Bluetooth® identifier is obtained. The bottle identifier is scanned. The unique serial code is entered at the website or is optionally automatically uploaded during data upload. The environmental data is saved in the database associated with the bottle identifier for later use.

Communication may also be performed via a wireless embodiment of the invention. Alternatively, or in combination, a wireless transceiver may be coupled with printed circuit board (PCB) and the sensor device in other embodiments of the invention. In these embodiments, pairing with a mobile device may be performed by holding the pinhole on/off button, e.g., for 5 seconds. By opening an application, i.e., "app", on a mobile device that is configured to accept an identifier, e.g., from a camera coupled with the mobile device, the bottle is identified. The bottle picture may be captured as well, with capture of the receipt being optional. By obtaining the unique identifier of device 100, i.e., from the memory within or coupled to the microcontroller, the association of the bottle identifier with the device identifier is complete. The same process may occur whether through a wired or wireless connection. Once the identifier of the device and environmental data has been uploaded, either to a mobile device or computer with a wireless interface, it may be saved in a database. In embodiments with a direct connection to the Internet and/or database, the bottle identifier and unique identifier of the device may be uploaded immediately to record the association of device to bottle. In other embodiments, the association may be stored in the device and/or app on mobile device either temporarily until access to the database is achieved, or for as long as desired. The data may be viewed including but not limited to the environmental data over time, image of the bottle, image of the receipt, unique identifier of the device and unique identifier of the bottle. In one or more embodiments, the bottle identifier is checked against the unique identifier of the device to make sure that the same data is being observed that is for the association of bottle to device, in other words to make sure that the device was not switched to an incorrect bottle. As described, pressure along with temperature and humidity levels observed by the device and hence the cork in the bottle are tied directly to a specific bottle and specific device, which is not obvious since known devices do not contemplate taking bottles on airplanes or at altitudes that may damage the cork of the bottle for example.

Embodiments enable a mobile device, laptop, notepad, smart watch or any other type of electronic device capable of displaying data and running an app that shows various environmental alerts, including warnings such as a high temperature warning, high pressure or low-pressure warning and humidity warning. The app may also be configured in one or more embodiments to show the image of the bottle and receipts, etc., and environmental values over time although this may also be accomplished via any other computer connected to the device directly or indirectly or via a database.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A bottle pressure seal with environmental data logging will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
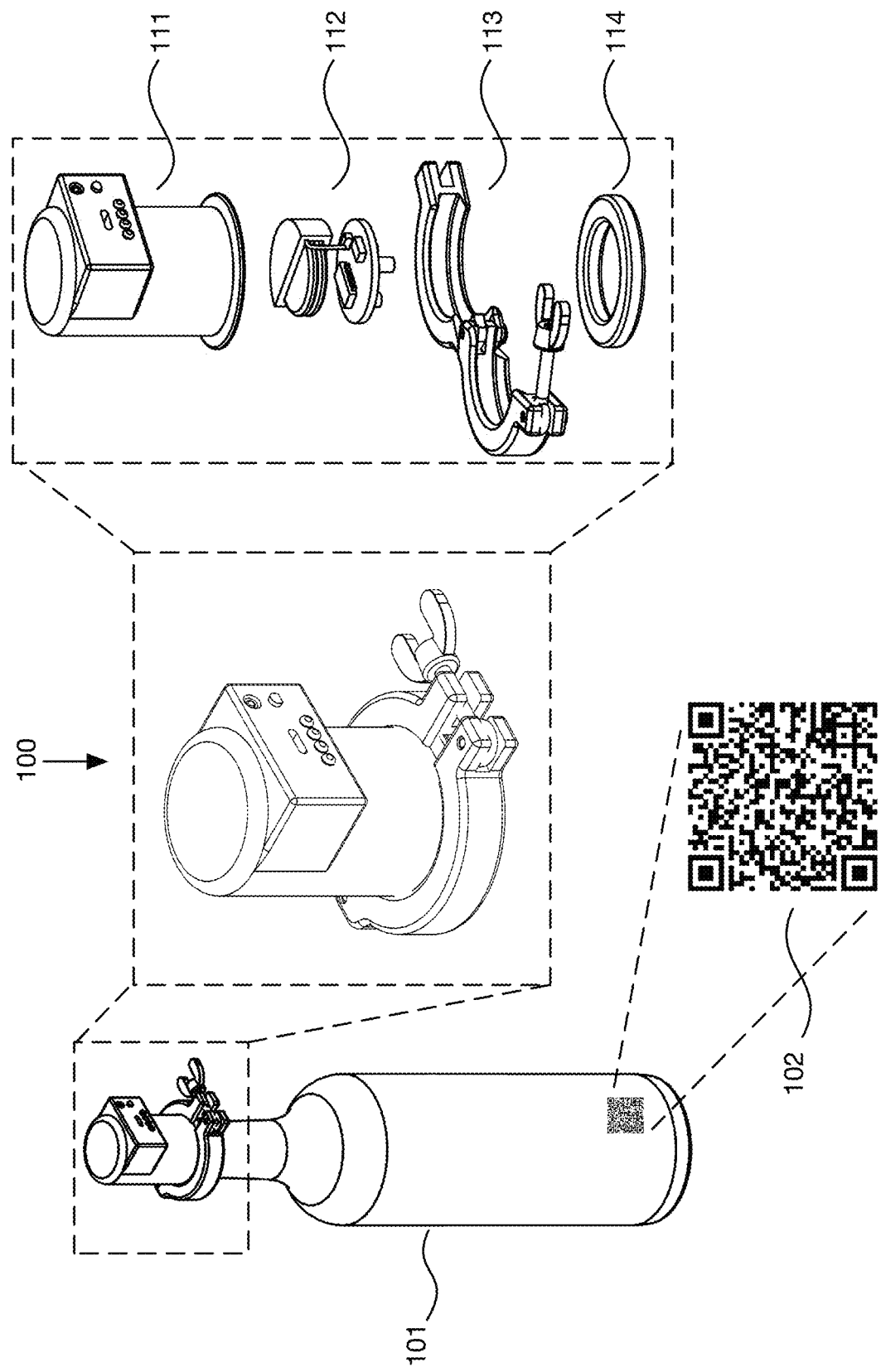
FIG. 1 shows an embodiment of the invention coupled with a bottle having an identifier, as well as showing the device separately and in exploded view.

FIG. 1 shows an illustrative device 100. As shown on the left portion of the figure, bottle pressure seal with environmental data logging, i.e., device 100 is coupled to bottle 101. Device 100 seals the atmospheric pressure outside of the bottle so that the internal pressure of the bottle and cork are maintained at whatever pressure they came into equilibrium with regardless of the external pressure outside of device 100 and bottle 101. Thus, in the event of air travel, where the pressure can be on the order of 1,800 to 2,400 meters (roughly 6,000 to 8,000 feet), the internal pressure of bottle 101 remains at the initial pressure at the time that device 100 was placed on bottle 101. Bottle identifier 102 on bottle 101 may be added via a sticker or laser engraving or in any other manner to identify the particular bottle. As shown identifier 102 is implemented with a QR code.

Device 100 includes cap 111 that houses battery, printed circuit board (PCB) and sensor device 112, along with clamp 113 and gasket 114. The PCB may house a microcontroller or any type of computing element that is programmable and configured to sample data from the environmental sensors and record the data in memory within the microcontroller or coupled thereto for example.

Device 100 is placed on bottle 101 generally before storing or traveling, by placing gasket 114 on the neck of the bottle, placing cap 111 onto the bottle neck, fitting clamp 113 over cap 111 and gasket 114 and tightening the wingnut. Any other coupling device equivalent may be utilized so long as the seal from gasket 114 and cap 111 maintain the internal pressure that is exhibited on the cork of the bottle for example.

In one or more embodiments identifier 102 may be scanned, for example with a camera that interprets QR codes, although RFID or any other type of identifier may be utilized. After the bottle is identified via bottle identifier 102, an app, for example on a smart phone or other computing device, may be utilized to access an individualized web page or database entry for example. Specifically, by accessing a database, the pressure, temperature and humidity data that has been logged by device 100 may be viewed or otherwise analyzed to determine if conditions have been within acceptable ranges for the cork on bottle 101. Purchase history or receipts may be viewed as well as any image of the bottle that was taken near the time that device 100 was placed on the bottle or at purchase or thereafter.

Figure 2:
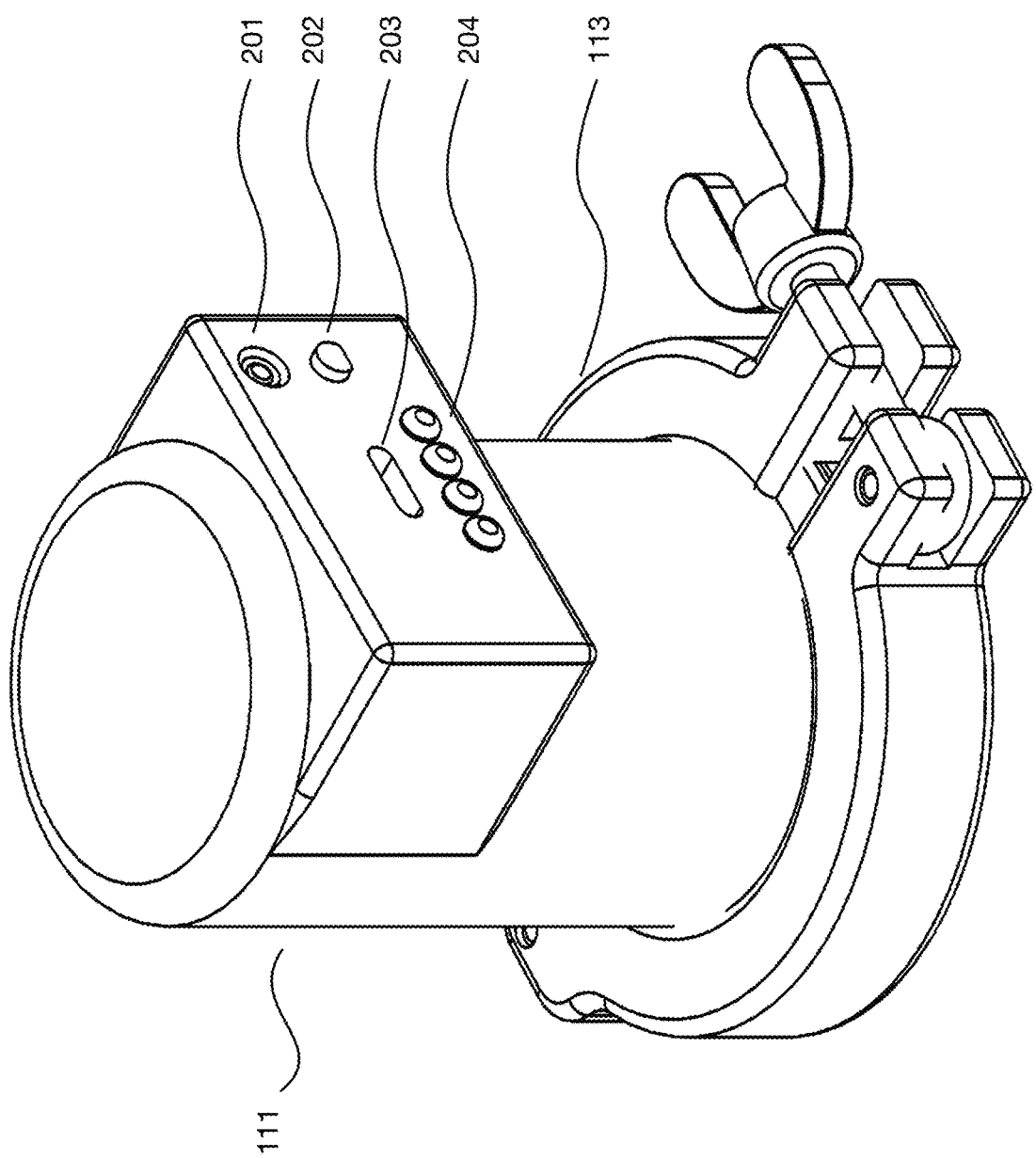
FIG. 2 shows an embodiment of the invention in closeup view.

FIG. 2 shows device 111 with pinhole on/off button 201, LED status light 202, data and charge port 203, in one or more embodiments implemented with a USB-C data and charge port and LED battery charge level indicator 204. In one or more embodiments, pinhole on/off button 201 is pressed and held until LED status light 202 starts flashing, indicating that data logging has commenced. LED battery charge level may be increased via a charging adapter coupled with data and charge port 203, which shows the battery level on LED battery charge level indicator 204. Initialization and association of the identifier with a particular cap may be performed in a variety of ways. In one or more embodiments, device 100 and bottle identifier 102 is supplied so that the device is automatically associated with the identifier. In other embodiments, asserting pinhole on/off button 201 for a set duration of time, e.g., 5 seconds, puts out a communications pairing packet, e.g., a Bluetooth® packet, that is received by any local smart phone for example that is running an app in pairing mode. In this embodiment a camera on the mobile device otherwise referred to as a smart phone is utilized to capture bottle identifier 102 and transmit that code to device 100. These embodiments bind a particular device to a particular bottle so that bottle pairing history is maintained locally. In one or more embodiments, device 100 has its own unique identifier, such as a Bluetooth® identifier. After pairing with a mobile device, an app running on the mobile device captures the bottle identifier 102 via camera and links that bottle identifier 102 with the unique Bluetooth® identifier of device 100. In this embodiment, the bottle identifier 102 and the unique identifier of the device is either recorded in the app or stored in the database rather or both recorded in the app and stored in the database. After initialization data logging of the sensor data begins and can be done on a time slice basis, for example storing the data once per N seconds or M minutes or H hours, which can be set in one or more embodiments via any associated smart phone. In one or more embodiments, data and charge port 203 may be augmented or replaced by a wireless transceiver to provide communications and/or data logging to a remote server directly or via a proxy server or to provide for status checking including battery charge status.

Figure 3:
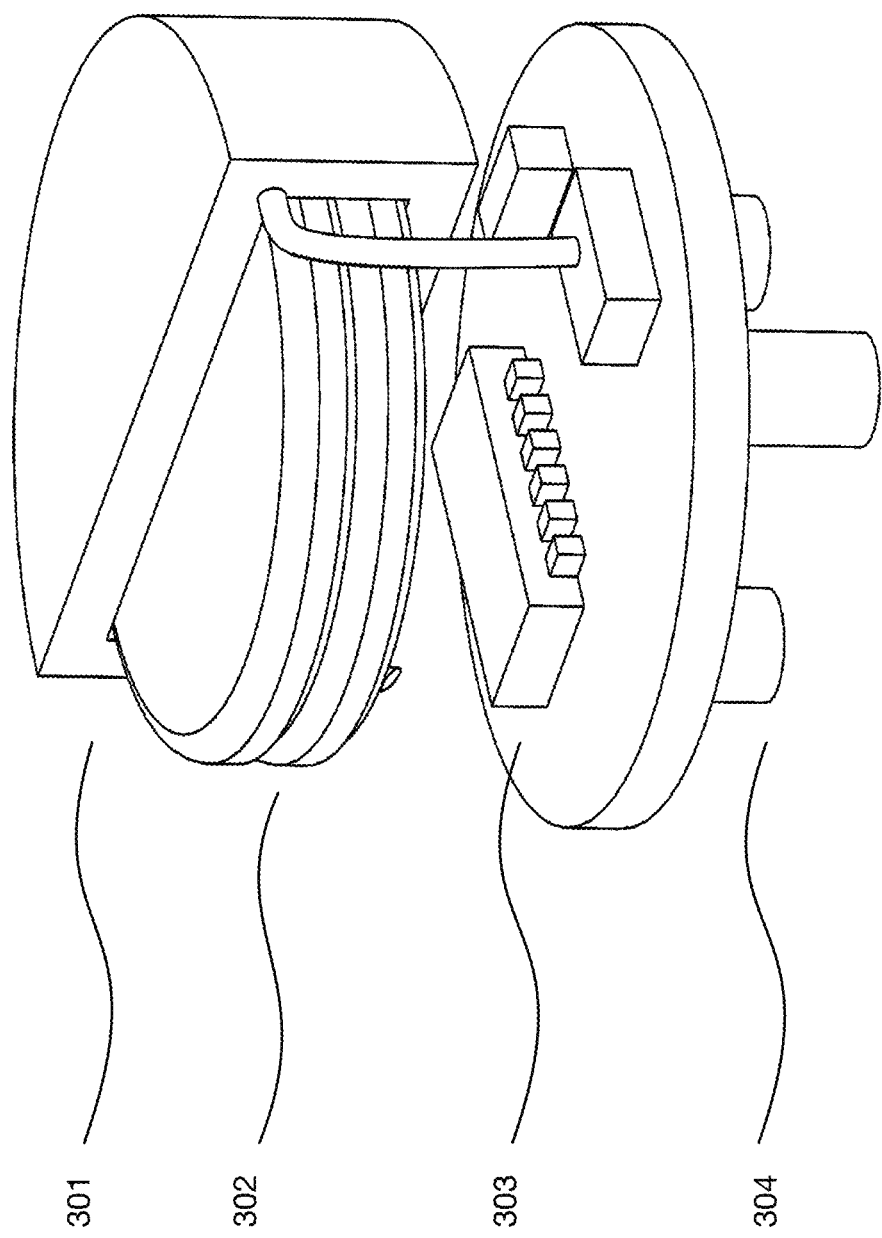
FIG. 3 shows an embodiment of the printed circuit board (PCB) and sensor device.

FIG. 3 shows printed circuit board (PCB) and sensor device 112, in cutaway view. Specifically, battery holder 301 holds two 3 V batteries that power programmable microcontroller shown on PCB board 303 with sensors 304 for temperature, pressure and humidity.

Figure 4:
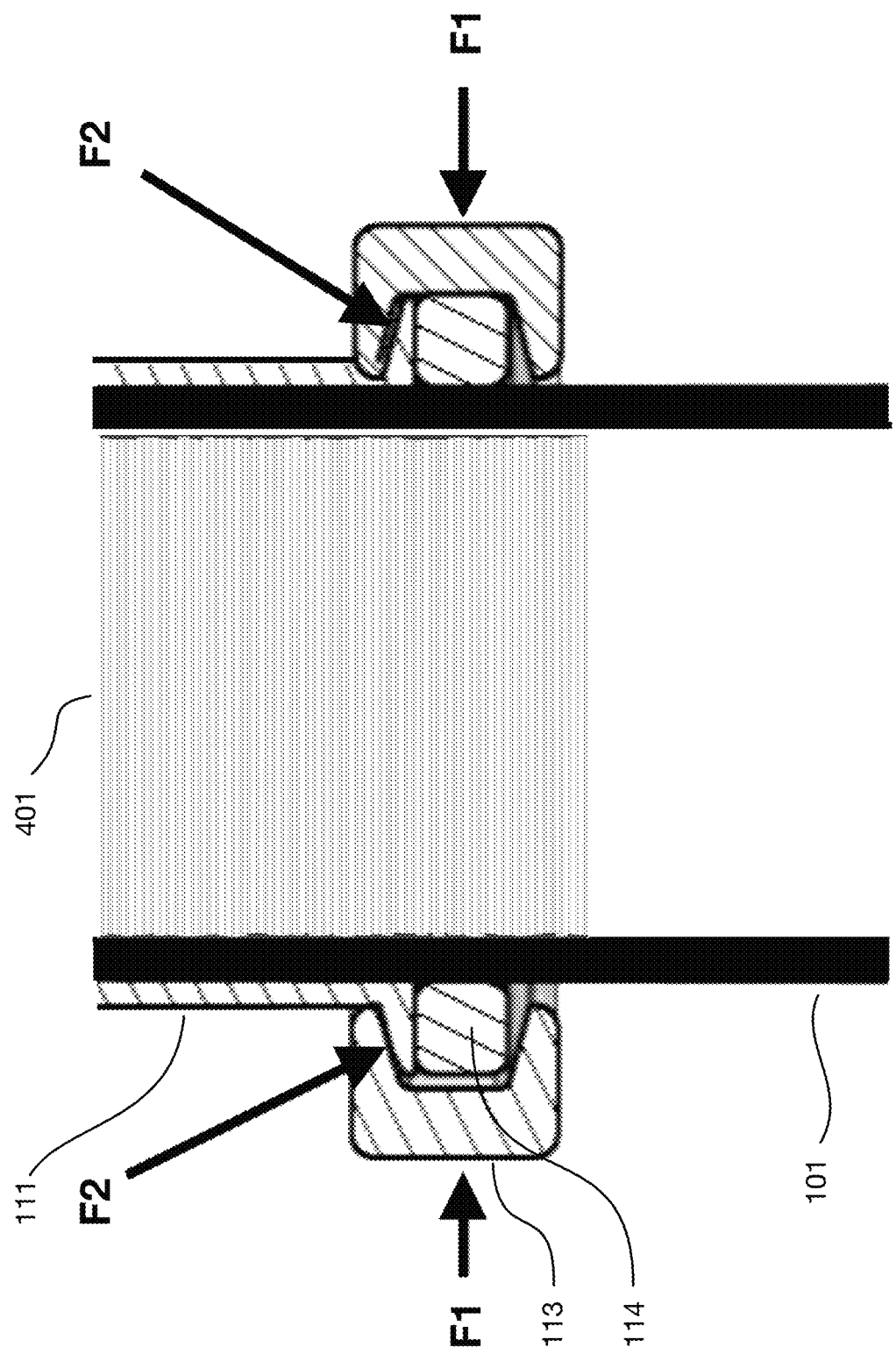
FIG. 4 shows an embodiment of the cap, clamp and gasket coupled with a bottle having a cork.

FIG. 4 shows a portion bottle neck 101 with a lower portion of cork 401 therein. In this cross-section view, clamp 113 includes an angled upper and lower portion that forces cap 111 and gasket 114 together at least on the bottom portion of cap 111 wherein force F1 that is applied as the gasket is compressed when clamp 113 is tightened imparts force F2 onto the angled portion of cap 111 and against gasket 114 that presses gasket 114 toward bottle 101. Once the gasket is in contact with cap 111 and bottle 101 and force F1 and F2 continue to increase, the strength of the seal is thus increased. The right side of the figure is a mirror of the left side and is not annotated for ease of viewing.

Figure 5:
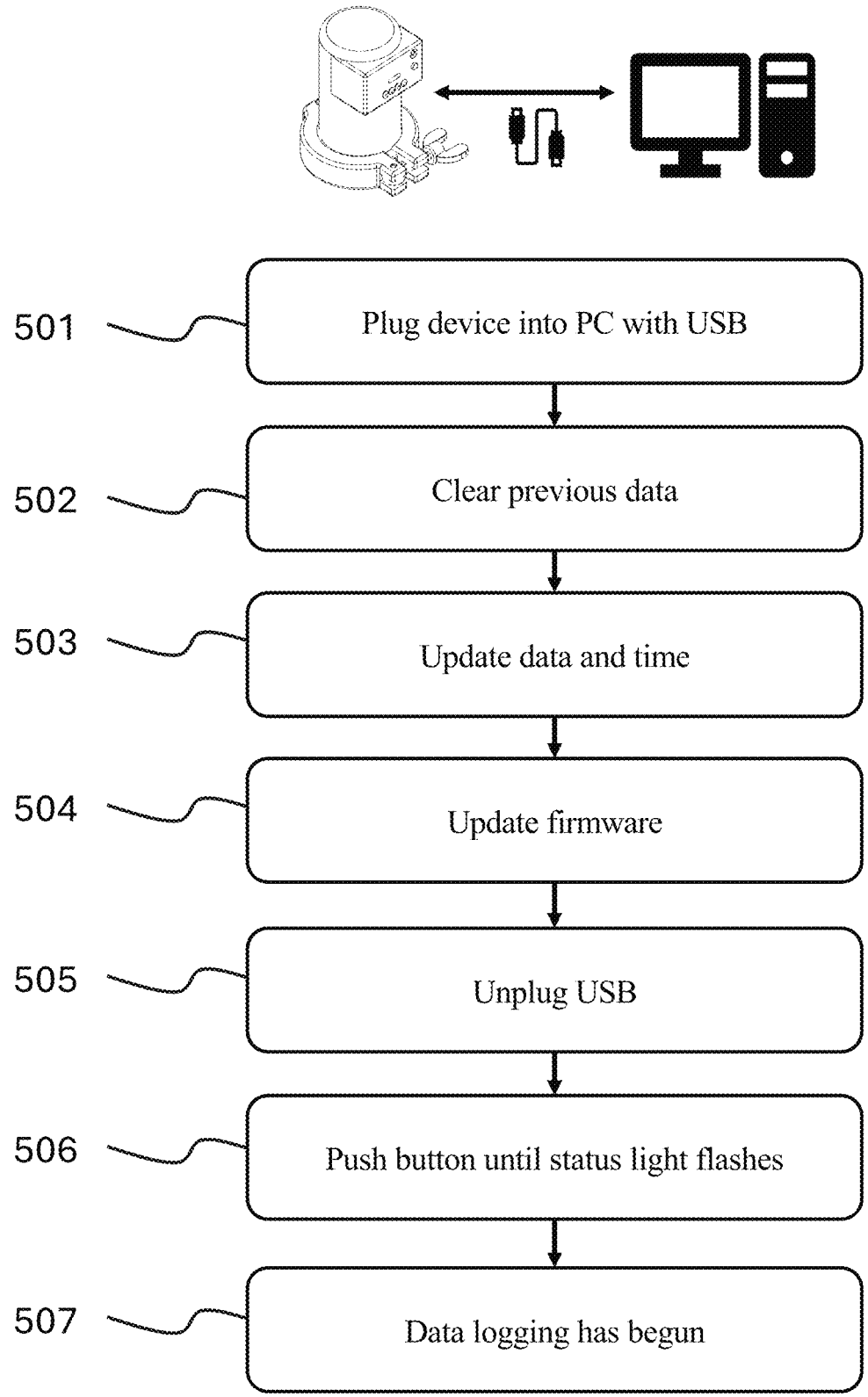
FIG. 5 shows an embodiment of the device in communication with a computer over a hardwired connection for configuration and initialization.

FIG. 5 shows an embodiment of initializing or otherwise configuring device 100 via USB with an external computer as illustrated at the top of the figure. Specifically, device 100 is plugged into a PC e.g., using a USB connection at 501.

Any other type of wired connection may be utilized in this hardwired embodiment. Any previous data may be optionally cleared at 502. Any configuration data may be updated, i.e., the bottle ID for example, the time interval between environmental sensor sampling, the time for status updates, etc., as well as the time/date may be updated at 503. Any firmware updates may also be performed at 504. Once the device is configured, it may be unplugged. After configuration, the device may be initialized at 506 to begin data logging at 507. In one or more embodiments, data may sampled and saved in internal memory or for example via a wireless connection according to the sampling interval defined in step 503.

Figure 6:
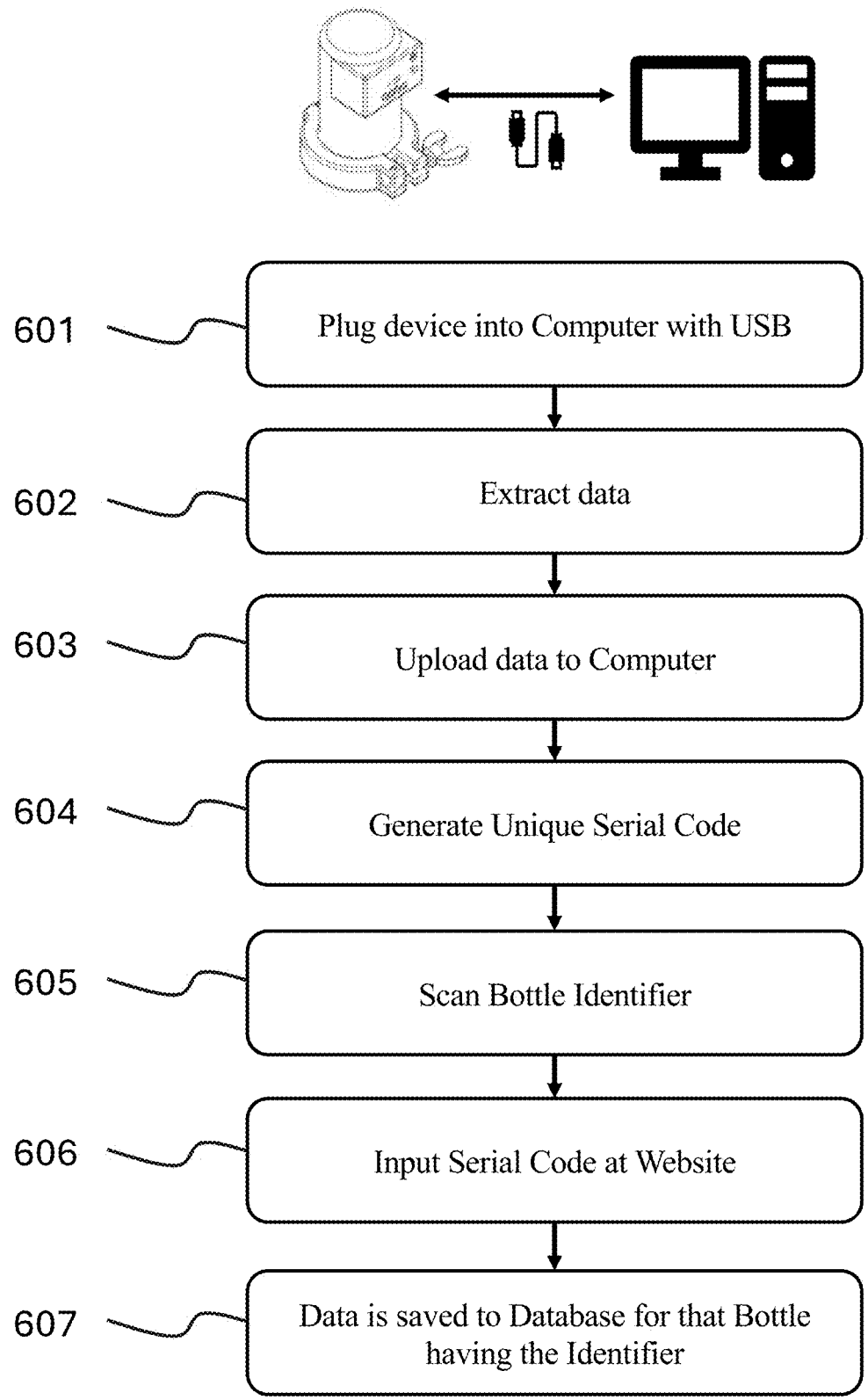
FIG. 6 shows an embodiment of the device in communication with a computer over a hardwired connection for data extraction and upload into a database for future use.

FIG. 6 shows an embodiment of saving data from device 100 via USB with an external computer as illustrated at the top of the figure. Specifically, device 100 is plugged into a PC e.g., using a USB connection at 601. Any other type of wired connection may be utilized in this hardwired embodiment. Environmental data is uploaded to the computer at 603. A unique serial code is optionally generated at 604, otherwise a unique device identifier from device 100, such as a Bluetooth® identifier is obtained. The bottle identifier is scanned at 605. The unique serial code is entered at website 606 or is optionally automatically uploaded during data upload 603. The environmental data is saved in the database associated with the bottle identifier for later use at 607.

Figure 7:
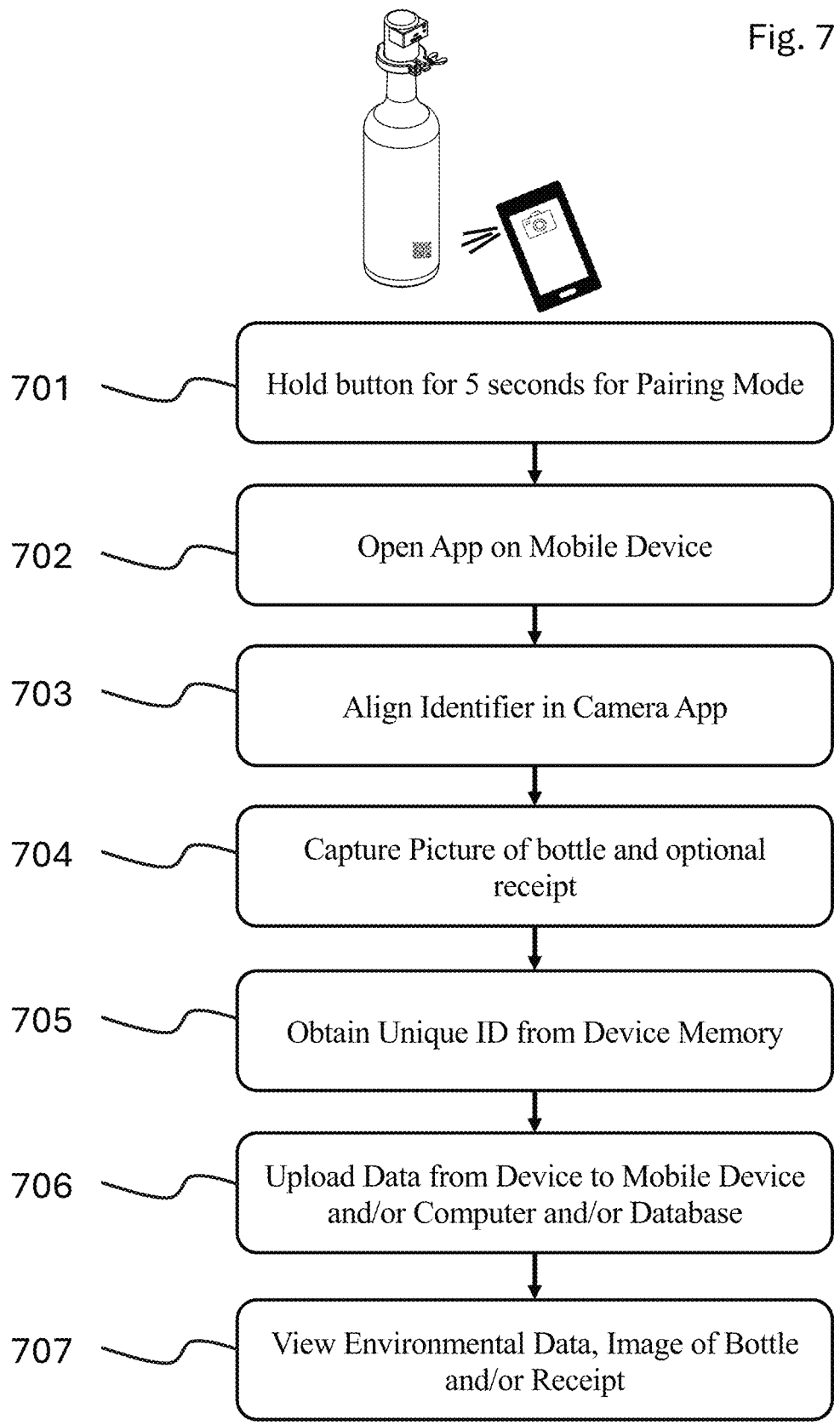
FIG. 7 shows an embodiments of the device in communication with a mobile device over a wireless connection for initial use and data upload.

FIG. 7 shows a wireless embodiment of the invention. Alternatively, or in combination, a wireless transceiver may be coupled with printed circuit board (PCB) and sensor device 112 in other embodiments of the invention. In this embodiment, pairing with a mobile device may be performed by holding pinhole on/off button 201, e.g., for 5 seconds. By opening an application, i.e., "app", on a mobile device at 702 that is configured to accept an identifier, e.g., from a camera coupled with the mobile device at 703, the bottle is identified. The bottle picture may be captured as well at 704, with capture of the receipt being optional. By obtaining the unique identifier of device 100 at 705, i.e., from the memory within or coupled to the microcontroller, the association of the bottle identifier with the device identifier is complete. The same process may occur whether through a wired or wireless connection. Once the identifier of the device and environmental data has been uploaded, either to a mobile device or computer with a wireless interface, it may be saved in a database at 706. In embodiments with a direct connection to the Internet and/or database, the bottle identifier 102 and unique identifier of the device 100 may be uploaded immediately to record the association of device to bottle. In other embodiments, the association may be stored in the device and/or app on mobile device either temporarily until access to the database is achieved, or for as long as desired. The data may be viewed at 707 including but not limited to the environmental data over time, image of the bottle, image of the receipt, unique identifier of the device and unique identifier of the bottle. In one or more embodiments, the bottle identifier is checked against the unique identifier of the device to make sure that the same data is being observed that is for the association of bottle to device, in other words to make sure that the device was not switched to an incorrect bottle. As described, pressure along with temperature and humidity levels observed by the device and hence the cork in the bottle are tied directly to a specific bottle and specific device 100, which is not obvious since known devices do not contemplate taking bottles on airplanes or at altitudes that may damage the cork of the bottle for example.

Figure 8:
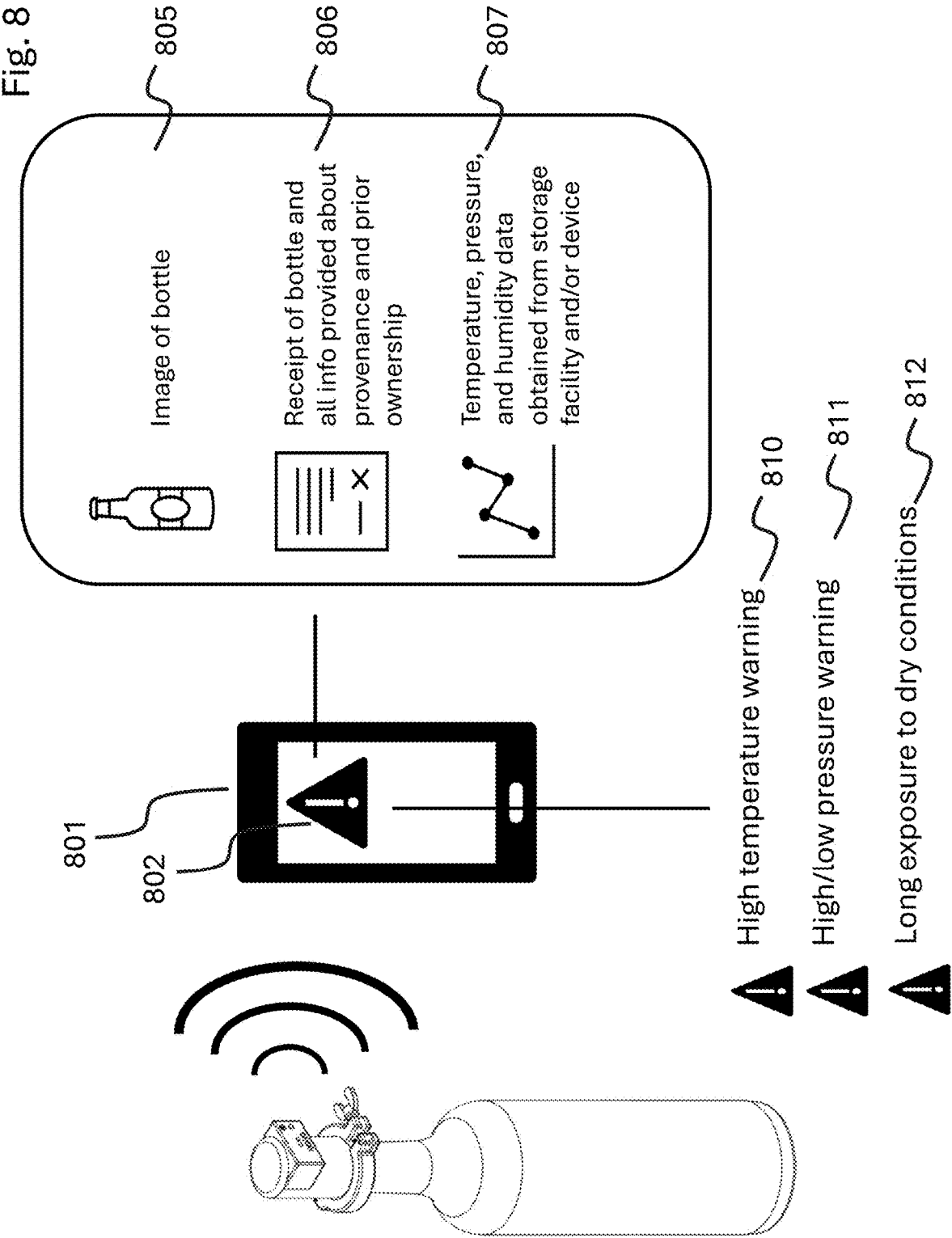
FIG. 8 shows an embodiment of the app running on a mobile device with typical information provided including environmental data over time, metadata related to the bottle and alerts.

FIG. 8 shows mobile device 801 running app 802 that shows various environmental alerts, including high temperature warning 810, high pressure or low-pressure warning 811 and humidity warning 812. App 802 is also configured in one or more embodiments to show the image of the bottle 805 and receipts, etc., 806 and environmental values over time 807 although this may also be accomplished via any other computer connected to the device directly or indirectly or via a database.

While the invention herein disclosed has been described by means of specific embodiments and applications thereof, numerous modifications and variations could be made thereto by those skilled in the art without departing from the scope of the invention set forth in the claims.

What is claimed is:

1. A bottle pressure seal device with environmental data logging, comprising:
 a cap configured to fit over an opening of a bottle and further configured to house
 at least one battery;
 a printed circuit board;
 a microcontroller mounted on said printed circuit board coupled with said at least one battery wherein said microcontroller or said printed circuit board comprises memory;
environment sensors that detect environmental data, said environmental sensors comprising
 a pressure sensor coupled with said microcontroller;
 a temperature sensor coupled with said microcontroller;
 a humidity sensor coupled with said microcontroller;
 a pressure seal comprising:
a gasket that is configured to engage a neck of a bottle and said cap;
a clamp configured to engage said gasket and said cap and seal atmospheric pressure into a chamber away from a cork in said neck of said bottle, wherein said atmospheric pressure outside of the bottle is sealed and internal pressure of the bottle and the cork are maintained at an initial pressure said bottle and said cork came into equilibrium with at a time when said bottle pressure seal device is placed on said bottle, regardless of the atmospheric pressure outside of said bottle pressure seal device and said bottle, in order to maintain the internal pressure that is exhibited on said cork of said bottle and in order to prevent changes in said internal pressure;
wherein said pressure sensor, said temperature sensor and said humidity sensor are configured to sense pressure level, temperature level and humidity level within said cap between said cap and said pressure seal;
wherein said microcontroller is configured to log said pressure level, said temperature level and said humidity level within said cap, between said cap and said pressure seal, in said memory,
 said pressure level, said temperature level, said humidity level and the cork in the bottle are tied directly to said bottle and said bottle pressure seal device.

2. The bottle pressure seal device with environmental data logging of claim 1, wherein said pressure seal further comprises a wingnut.

3. The bottle pressure seal device with environmental data logging of claim 1, wherein said microcontroller is configured to initiate data logging after accepting an assertion of an on/off button.

4. The bottle pressure seal device with environmental data logging of claim 1, wherein said microcontroller is configured to show that data logging has begun.

5. The bottle pressure seal device with environmental data logging of claim 1, wherein said microcontroller is configured to enable charging via a data and charge port.

6. The bottle pressure seal device with environmental data logging of claim 1, wherein said microcontroller is configured to show battery charge level via a battery charge level indicator.

7. The bottle pressure seal device with environmental data logging of claim 1, wherein said environmental data is obtained via a data and charge port.

8. The bottle pressure seal device with environmental data logging of claim 1, wherein said bottle pressure seal device is connected directly to the bottle via a bottle identifier, wherein said bottle identifier comprises a QR code, a serial code or a laser engraved identifier on the bottle.

9. The bottle pressure seal device with environmental data logging of claim 1, wherein said memory comprises an image of the bottle taken near a time when the bottle pressure seal device is placed on the bottle.

10. The bottle pressure seal device with environmental data logging of claim 1, wherein said environmental data from said environmental sensors is uploaded to one or more of a computer, a mobile device and a database, and wherein data in said memory of said bottle pressure seal device is cleared.

11. A bottle pressure seal device with environmental data logging, comprising:
- a cap configured to fit over an opening of a bottle and further configured to house
- at least one battery;
- a printed circuit board;
- a microcontroller mounted on said printed circuit board coupled with said at least one battery wherein said microcontroller or said printed circuit board comprises memory;
- environment sensors that detect environmental data, said environmental sensors comprising
- a pressure sensor coupled with said microcontroller;
- a temperature sensor coupled with said microcontroller;
- a humidity sensor coupled with said microcontroller;
- a pressure seal comprising
- a gasket that is configured to engage a neck of a bottle and said cap;
- a clamp configured to engage said gasket and said cap and seal atmospheric pressure into a chamber away from a cork in said neck of said bottle, wherein said atmospheric pressure outside of the bottle is sealed and internal pressure of the bottle and the cork are maintained at an initial pressure said bottle and said cork came into equilibrium with at a time when said bottle pressure seal device is placed on said bottle, regardless of the atmospheric pressure outside of said bottle pressure seal device and said bottle, in order to maintain the internal pressure that is exhibited on said cork of said bottle and in order to prevent changes in said internal pressure;
- wherein said pressure sensor, said temperature sensor and said humidity sensor are configured to sense pressure level, temperature level and humidity level within said cap between said cap and said pressure seal;
- wherein said microcontroller is configured to log said pressure level, said temperature level and said humidity level within said cap, between said cap and said pressure seal, in said memory,
  - said pressure level, said temperature level, said humidity level and the cork in the bottle are tied directly to said bottle and said bottle pressure seal device;
- wherein
- said bottle pressure seal device is connected directly to the bottle via a bottle identifier, wherein said bottle identifier comprises a QR code, a serial code or a laser engraved identifier on the bottle, or
- said memory comprises an image of the bottle configured to be taken near a time that the bottle pressure seal device is placed on the bottle to ensure that the bottle that is first connected to the bottle pressure seal device is a same bottle; and
- wherein said environmental data from said environmental sensors is uploaded to one or more of a computer, a mobile device and a database, and wherein data in said memory of said bottle pressure seal device is cleared.

* * * * *